(12) United States Patent
Salzmann et al.

(10) Patent No.: US 6,432,033 B1
(45) Date of Patent: Aug. 13, 2002

(54) FOLDING METHOD FOR THE GAS BAG OF A SIDE GAS BAG

(75) Inventors: Claudia Salzmann, Lohr; Andreas Weis, Aschaffenburg, both of (DE)

(73) Assignee: TRW Automotive Safety Systems GmbH & Co. KG, Aschaffenburg (DE)

( * ) Notice: Subject to any disclaimer, the term of this patent is extended or adjusted under 35 U.S.C. 154(b) by 0 days.

(21) Appl. No.: 09/545,317

(22) Filed: Apr. 7, 2000

(30) Foreign Application Priority Data

Apr. 9, 1999 (DE) .......................................... 199 16 084

(51) Int. Cl.⁷ ................................................. B31B 1/26
(52) U.S. Cl. ....................... 493/231; 493/243; 493/244; 493/940; 280/728.1
(58) Field of Search ........................... 280/728.1, 743.1; 493/405, 940, 451, 458, 243, 244, 231

(56) References Cited

U.S. PATENT DOCUMENTS

| | | | |
|---|---|---|---|
| 5,493,846 A | | 2/1996 | Baker et al. |
| 5,803,483 A | * | 9/1998 | Lunt |
| 5,823,567 A | | 10/1998 | Behr et al. |
| 5,826,901 A | * | 10/1998 | Adomeit |
| 6,029,996 A | * | 2/2000 | Yoshioka et al. |
| 6,092,839 A | * | 7/2000 | Nagano |
| 6,171,228 B1 | * | 1/2001 | Marotzke et al. |
| 6,196,585 B1 | * | 3/2001 | Igawa |

FOREIGN PATENT DOCUMENTS

| | | |
|---|---|---|
| DE | 4343026 A1 | 6/1994 |
| DE | 19731450 | 1/1998 |
| DE | 19704670 | 8/1998 |
| EP | 0800961 A1 | 10/1997 |

* cited by examiner

Primary Examiner—Eugene Kim
(74) Attorney, Agent, or Firm—Tarolli, Sundheim, Covell, Tummino & Szabo L.L.P.

(57) ABSTRACT

A method of folding a side gas bag in a packet form having a gas bag consisting of a substantially rectangular fabric section having rounded corners, a connecting plate for connecting to a gas generator and having fastening bolts projecting through the fabric section includes the steps of folding the fabric section along a first fold edge to an approximately square shape with free edges; arranging the free edges one over the other; and connecting the free edges with each other to form the closed bag. During the folding, a free space i8s formed between two adjacent layers of the fabric sections for the insertion of a fold rule. Thereafter, the free space is widened by means of a fold rule and the remaining fabric material is then, by means of further fold rules externally engaging and inserted, folded in on both sides from a center of the free space several times in meandering from in layers parallel to the connecting plate.

3 Claims, 7 Drawing Sheets

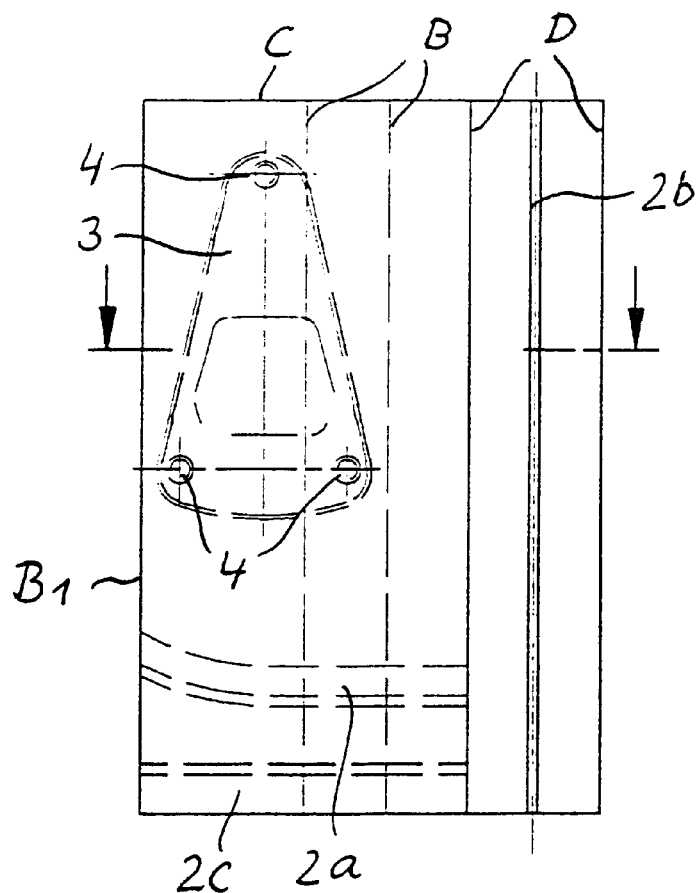
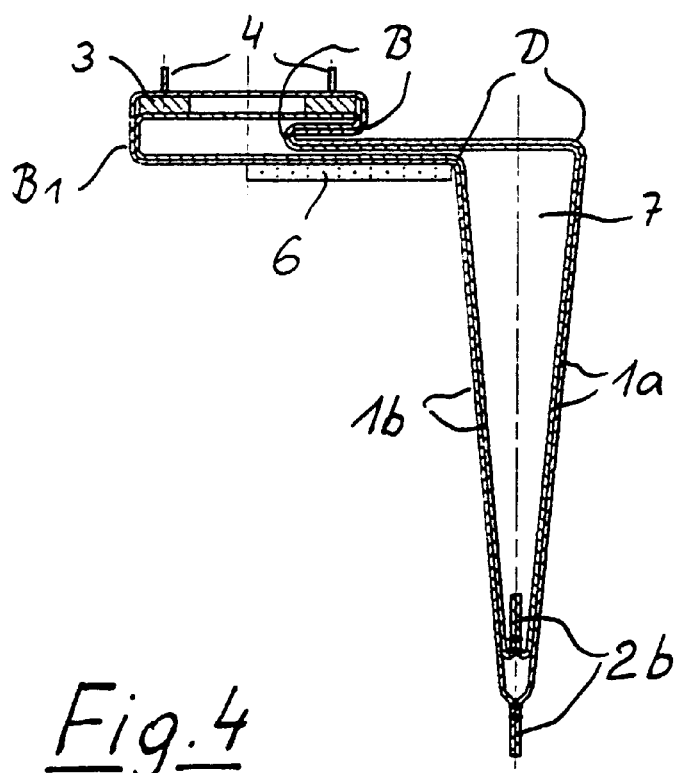
Fig.4

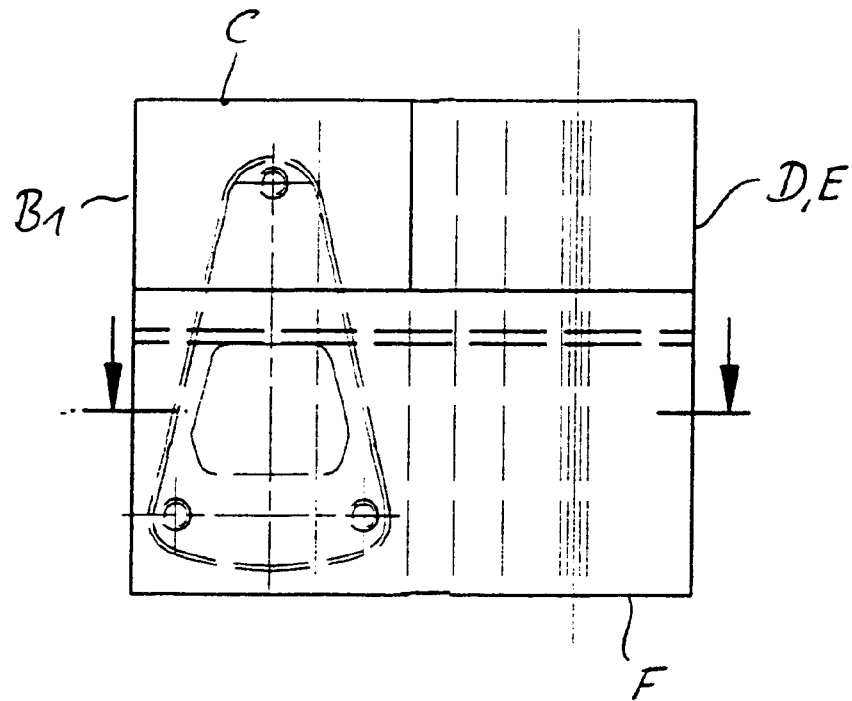
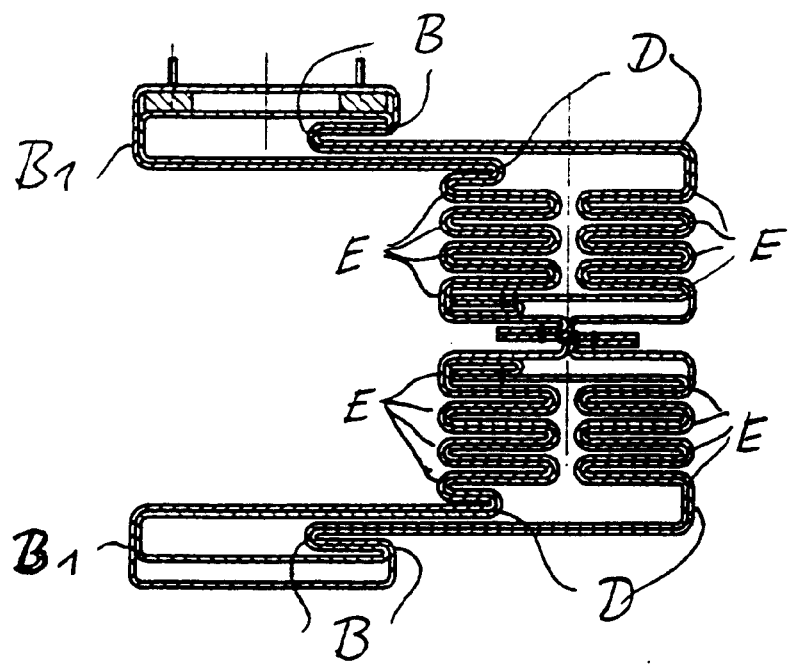
Fig. 8

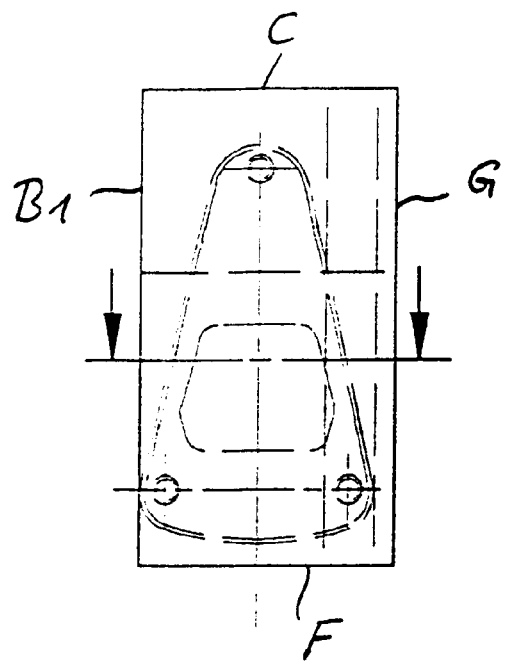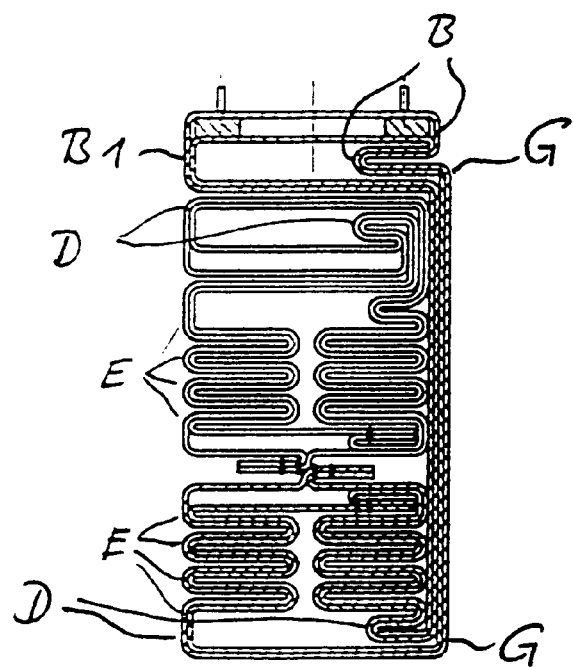
Fig. 9

FOLDING METHOD FOR THE GAS BAG OF A SIDE GAS BAG

BACKGROUND OF THE INVENTION

The invention relates to a method for folding a gas bag of a side gas bag. The gas bag is intended to be folded into a packet form which consists of a substantially rectangular fabric section rounded at the corners, which is folded along a common fold edge to an approximately square shape and the free edges of which, placed one over another, are connected with each other to form a closed gas bag, and in which in the region of the common fold edge a connecting plate for a gas generator can be arranged, the connecting plate having fastening bolts projecting outwards through the fabric.

The packet form of an gas bag for an gas bag module is determined on the one hand by the available installation space and on the other hand by the desired expansion behavior of the gas bag on being inflated explosion-like in an accident situation. In the case of so-called side gas bags, which are intended to reduce the risk of injury to the vehicle occupants with acceleration forces directed transversely to the longitudinal axis of the vehicle, the designer has to manage on the one hand with relatively small installation spaces and on the other hand must realize very short inflation times which lie in the region of only 20 to 30% of the inflation times which are available for front gas bags. Packet forms which satisfy these requirements must in addition be able to be realized as economically as possible.

BRIEF DESCRIPTION OF THE INVENTION

For a packet form which fulfills all the above-mentioned conditions, it is proposed to fold an gas bag in the following manner: The gas bag consists of a substantially rectangular fabric section having rounded corners, the fabric section being folded along a first fold edge to an approximately square shape with free edges, the free edges being arranged one over the other and being connected with each other so as to form the closed gas bag, the gas bag being provided with a connecting plate adapted for connection to a gas generator and arranged in the region of the first fold edge, the connecting plate having fastening bolts projecting outwards through the fabric section. The method comprises the following steps: First, an edge of the gas bag running approximately perpendicularly to the first fold edge and belonging to a of the gas bag not containing the connecting plate, is turned into the gas bag so as to be arranged in parallel and adjacent to an opposite edge of the gas bag, whereby a fold form is produced which is four layered substantially throughout, extends parallel to the connecting plate and is comprised of two fabric section halves. Then, the fabric section halves are folded in parallel to the first fold edge to a fold form in which the connecting plate lies immediately adjacent to a second fold edge on a rim side, the fabric section having edges lying opposite the fold edge and being arranged adjacent to each other, the connecting plate and the fabric sections lying in planes parallel to each other. Thereafter, the fold form is turned down, by using a fold rule, through approximately 90° from a plane parallel to the connecting plate along the first fold edge as well as along fold edges lying parallel to each other and spaced apart from the connecting plate and from each other, a free space being formed between every two adjacent layers of the fabric sections for the insertion of a fold rule. Then, the free space is widened by means of a fold rule and the remaining fabric material is then, by means of further fold rules externally engaging and inserted, folded in on both sides from a center of the free space several times in meandering form in layers parallel to the connecting plate. Finally, the packet form thus produced is turned down through 180° around two fold edges running perpendicularly to each other, and is pressed on a reverse face against the gas bag region containing the connecting plate.

It has been found that in this way a packet form can be achieved in which the gas bag for a side gas bag can be folded to the available installation space without difficulties, without any unnecessary delays occurring during the explosion-like inflation, through which the prescribed short inflation time would be exceeded. The folding expenditure remains within the framework of conventional gas bag folding methods. As regards the arrangement of the connecting plate, both a symmetrical and also an asymmetrical position is able to be realized.

BRIEF DESCRIPTION OF THE DRAWINGS

The folding method according to the invention is explained in further detail with the aid of the embodiment illustrated in FIGS. 1 to 9, in which:

FIG. 4 shows in a top view and in a sectional view the next folding step, by which the region adjacent to the connecting plate is folded through approximately 90°;

FIG. 8 shows in a top view and in a sectional view the packet form achieved by the penultimate folding step;

FIG. 9 shows in a top view and in a sectional view the final packet form.

DETAILED DESCRIPTION OF THE INVENTION

Figure 1:
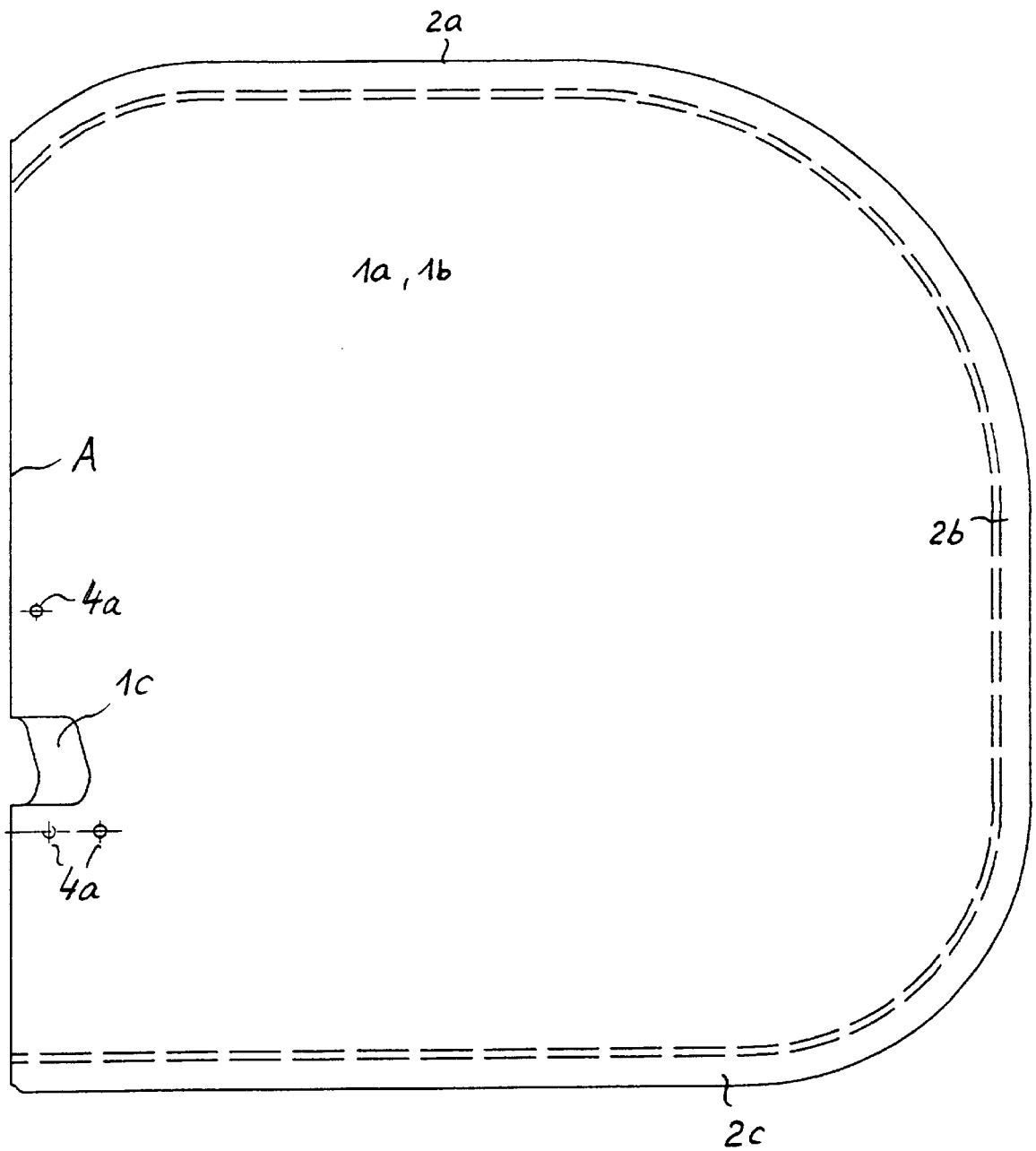
FIG. 1 shows the initial form of the gas bag.
Figure 2:
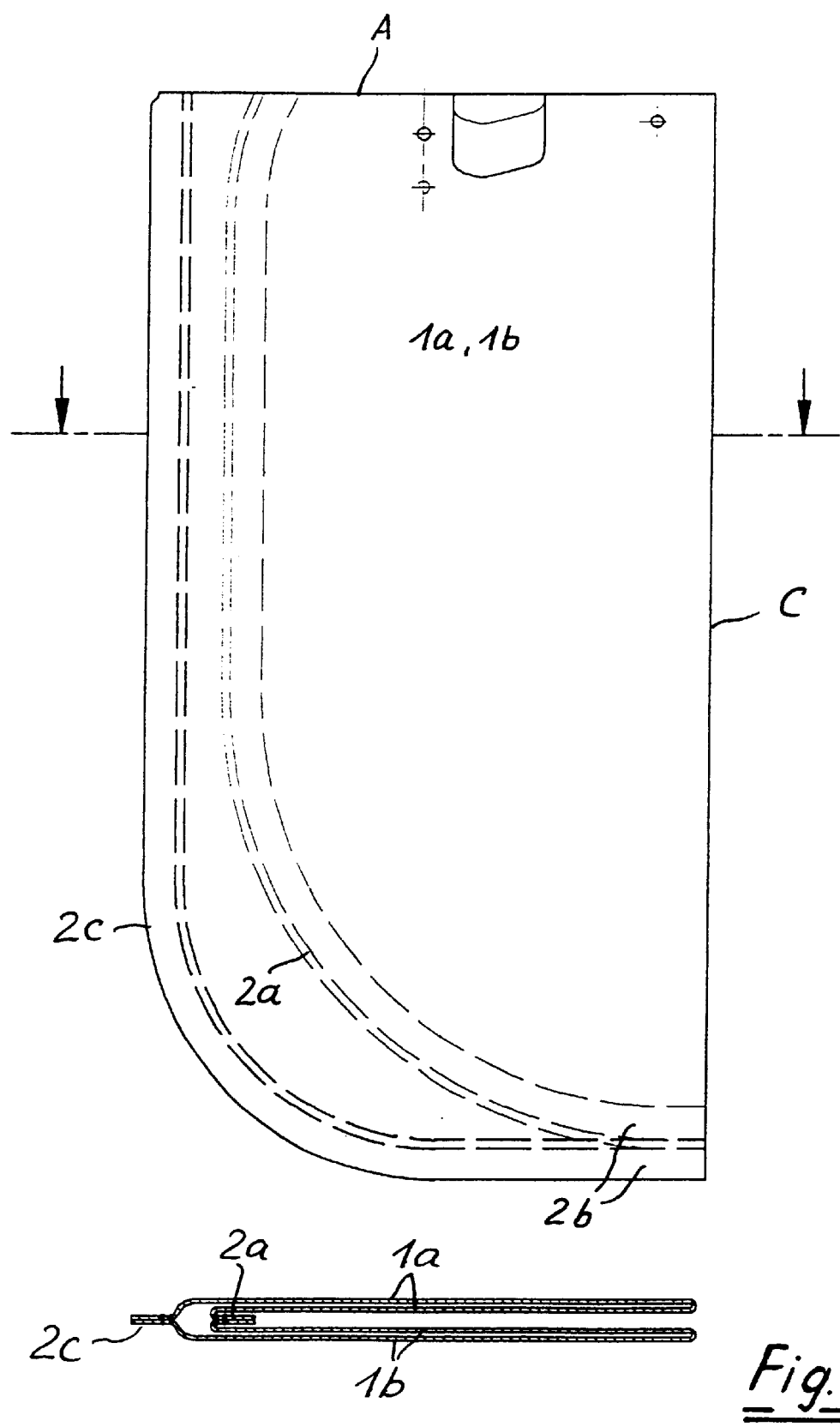
FIG. 2 shows in a top view and in a sectional view a first folding step, through which one half of the gas bag is turned into the other.

The initial form illustrated in FIG. 1 shows a fabric section 1 with fabric section halves 1*a* and 1*b* placed one over another, which have a common fold edge A and edges 2*a*, 2*b*, 2*c* connected with each other. In addition, an inflation opening 1*c* and holes 4*a* are provided for the insertion of fastening bolts. Before the folding method according to the invention is carried out, a connecting plate 3 (see FIG. 3) can be placed between the two fabric section halves 1*a*, 1*b* through the inflation opening 1*c* such that its fastening bolts 4 project outwards through the holes 4*a*. In a first folding step, the upper edge 2*a* is turned in, between the fabric section halves 1*a* and 1*b*, so that it lies substantially parallel opposite the lower edge 2*c*. Thereby, the fabric section halves 1*a* and 1*b* are quasi doubled, as can be seen from the sectional illustration of FIG. 2.

Figure 3:
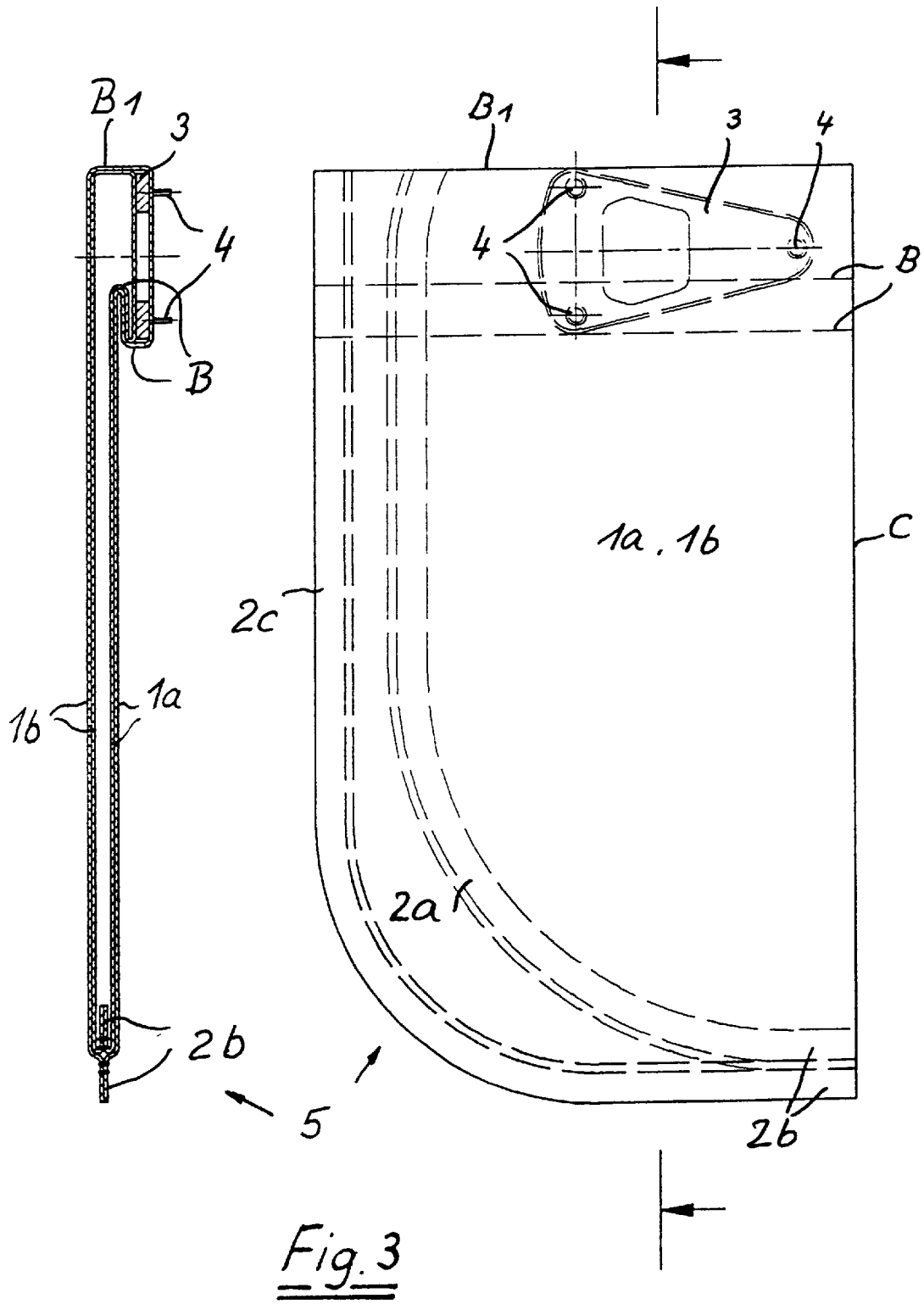
FIG. 3 shows in a top view and in a sectional view a second folding step for the arrangement of the connecting plate in the plane of extension of the gas bag.

Then the connecting plate 3 and the fabric section halves 1*a* and 1*b* are brought into planes of extension parallel to each other, by the fabric section half 1*a* being folded in parallel to the fold edge A along the fold edges B and B1. Thereby, the fold form 5 illustrated in FIG. 3 is achieved.

Figure 5:
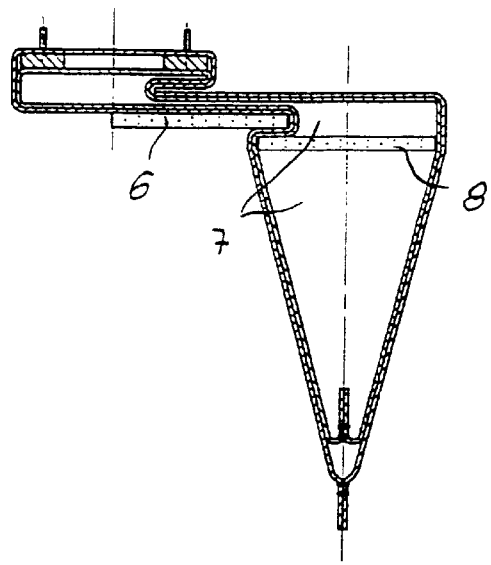
FIGS. 5 to 7 show further folding steps in a sectional view.
Figure 6:
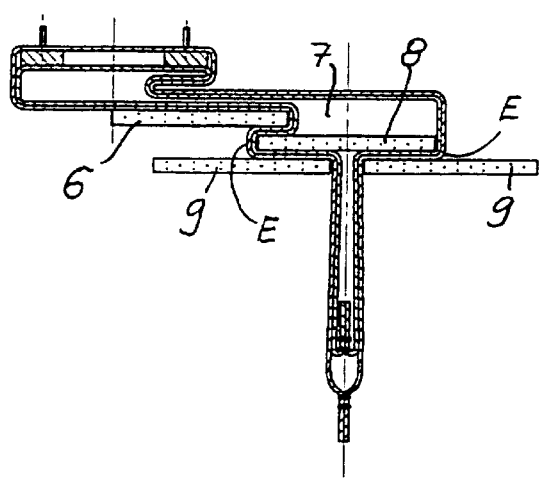
Figure 7:
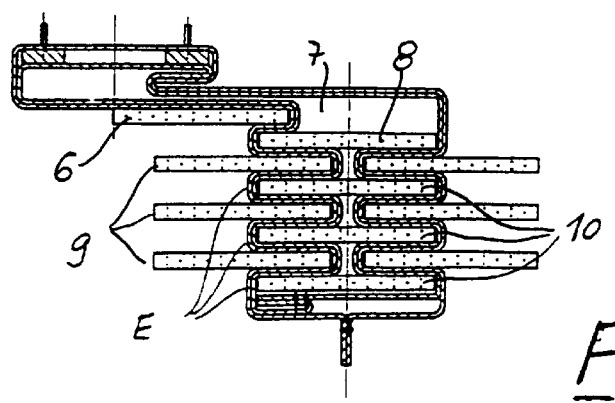

Next, in accordance with FIG. 4, the right-hand part of the packet form 5 is turned down along the fold line D approximately 90° from the plane parallel to the connecting plate 3, a free space 7 being formed between every two layers of the fabric section halves 1a, 1b for the insertion of a fold rule. The downward laying around is effected by using a fold rule 6 which is placed parallel to the fold edge A. Proceeding from the fold form according to FIG. 4, the folds resulting from FIGS. 5 to 7 are then carried out using inserted and externally placed fold rules 8, 9, 10, whereby the majority of the gas bag is placed one over another in a meandering form. At this stage, it is to be pointed out that the thickness of the fabric section halves 1a, 1b is illustrated on an enlarged scale compared with the longitudinal- and transverse dimensions of the gas bag, because otherwise in terms of technical drawing the individual layers of the fabric section could not be made visible. Thereby, the thickness of the fold packet appears to be substantially greater than in reality.

The fold packet with the folding in meandering form according to FIG. 7 is then folded over along a fold edge F running beneath the connecting plate 3, so that a doubling of the meandering fold packet is achieved, as can be seen from the lower sectional view in FIG. 8. Finally, this fold packet is turned down through 180° again over two fold edges G running parallel to the fold edge A and is pressed on the reverse face against the gas bag region containing the connecting plate 3. Thereby, the final form results which can be seen from FIG. 9, which is reduced in the cross-sectional dimensions substantially to the dimension of the connecting plate 3 and which produces the fold formation, encased into each other and largely of meandering form, which can be seen from the sectional illustration of FIG. 9. It is to be stressed once again that the two fold edges G in the illustration are only spaced so far apart from each other because the thickness of the fabric layers had to be drawn larger. In reality, these two edges lie substantially more closely adjacent to each other, and the total packet has a substantially smaller thickness than in the sectional view of FIG. 9.

The folding method according to the invention differs from those known hitherto primarily in that approximately one half of the initial form is turned into the other half and that the reduction of the planar extension is achieved substantially by folding in in a meandering form. In so-called inflation tests, it has been found that the packet form achieved by the method according to the invention unfolds without problems on activation of the charge and that the gas bag readily achieves its final form within the inflation time lying in the region of 10 milliseconds and thus can perform the optimum protective function. The folding method according to the invention is not necessarily restricted to the initial form shown in the embodiment. The only determining factor is that through turning in, a doubling of the fabric layers can be achieved and that then folding in takes place in a meandering form.

What is claimed is:

1. A method for folding a side gas bag into a packet form, said gas bag consisting of a substantially rectangular fabric section having rounded corners, said fabric section being folded along a first fold edge to an approximately square shape with free edges, said free edges being arranged one over the other and being connected with each other so as to form said closed gas bag, said gas bag being provided with a connecting plate for connection to a gas generator and arranged in the region of said first fold edge, said connecting plate having fastening bolts projecting outwards through said fabric section, said method comprising the following steps:

an edge of said gas bag running approximately perpendicularly to said first fold edge and belonging to said gas bag not containing said connecting plate, is turned into said gas bag so as to be arranged in parallel and adjacent to an opposite edge of said gas bag, whereby a fold form is produced which is four-layered substantially throughout, extends parallel to said connecting plate and is comprised of two fabric section halves, said fabric section halves are folded in parallel to said first fold edge to a fold form in which said connecting plate lies immediately adjacent to a second fold edge on a rim side, said fabric section having edges lying opposite said fold edge and being arranged adjacent to each other, said connecting plate and said fabric sections lying in planes parallel to each other;

said fold form is turned by using a fold rule, through approximately 90° from a plane parallel to said connecting plate along said first fold edge as well as along said fold edges lying parallel to each other and spaced apart from said connecting plate and from each other, a free space being formed between every two adjacent layers of said fabric sections for the insertion of a fold rule;

the free space is widened by means of a fold rule and the remaining fabric material is then, by means of further fold rules inserted into said free space and further fold rules externally engaging said fabric material, folded in on both sides from a center of said free space several times in meandering form in layers parallel to said connecting plate; and finally the packet form thus produced is turned through 180° around two fold edges running perpendicularly to each other, and is pressed on a reverse face against said gas bag region containing said connecting plate.

2. The method according to claim 1, wherein said gas bag is arranged symmetrically with respect to said first fold edge.

3. The method according to claim 1, wherein said gas bag is arranged asymmetrically with respect to said first fold edge.

* * * * *